Inventor:
Richard Tröger,
His Attorney.

Inventor:
Richard Tröger,
by Harry E. Dunham
His Attorney.

June 28, 1938. R. TRÖGER 2,122,304
CONTROL SYSTEM FOR ELECTRIC VALVE APPARATUS
Filed Feb. 1, 1937   3 Sheets-Sheet 3

Inventor:
Richard Tröger,
by Harry E. Dunham
His Attorney.

UNITED STATES PATENT OFFICE 2,122,304

CONTROL SYSTEM FOR ELECTRIC VALVE APPARATUS

Richard Tröger, Berlin-Zehlendorf-Mitte, Germany, assignor to General Electric Company, a corporation of New York Application February 1, 1937, Serial No. 123,517
In Germany February 28, 1936

6 Claims. (Cl. 175—363)

My invention relates to control systems and more particularly to control circuits for electric valve apparatus.

In the control of electronic discharge devices, particularly in the control of electronic discharge devices employing ionizable mediums such as gases or vapors, it has been found that a very satisfactory control of the electronic discharge device is obtained by controlling the voltage impressed on the control member of the electronic discharge device. These circuits, which control electronic discharge devices by controlling the energization of the control member, require apparatus of smaller size and proportion than that which would be required if the same electronic discharge devices were controlled by operating on the anode-cathode circuit of the devices. It has become increasingly apparent that this type of control of electronic discharge devices is highly desirable in those applications where precision in operating characteristics as well as economy of apparatus are important. In view of these factors, there has been evidenced a decided need for new and improved circuits for controlling electronic discharge devices whereby there is effected a material improvement in operating characteristics and economy.

It is an object of my invention to provide a new and improved control circuit for electronic discharge devices.

It is another object of my invention to provide a new and improved control circuit for electronic discharge apparatus whereby there is afforded greater facility in the control of electronic discharge devices.

In accordance with the illustrated embodiments of my invention, I provide a new and improved control circuit for electronic discharge devices in which there is employed an element the resistance of which varies in accordance with the intensity of a magnetic field for introducing in the control circuit a control voltage which varies in accordance with a predetermined controlling influence. More particularly, a bismuth resistance element is associated with a magnetic field the intensity of which varies in accordance with the voltage, the current, or the frequency, of an associated circuit or of associated apparatus to provide a control voltage for controlling the conductivity of electronic discharge apparatus.

Figure 1:
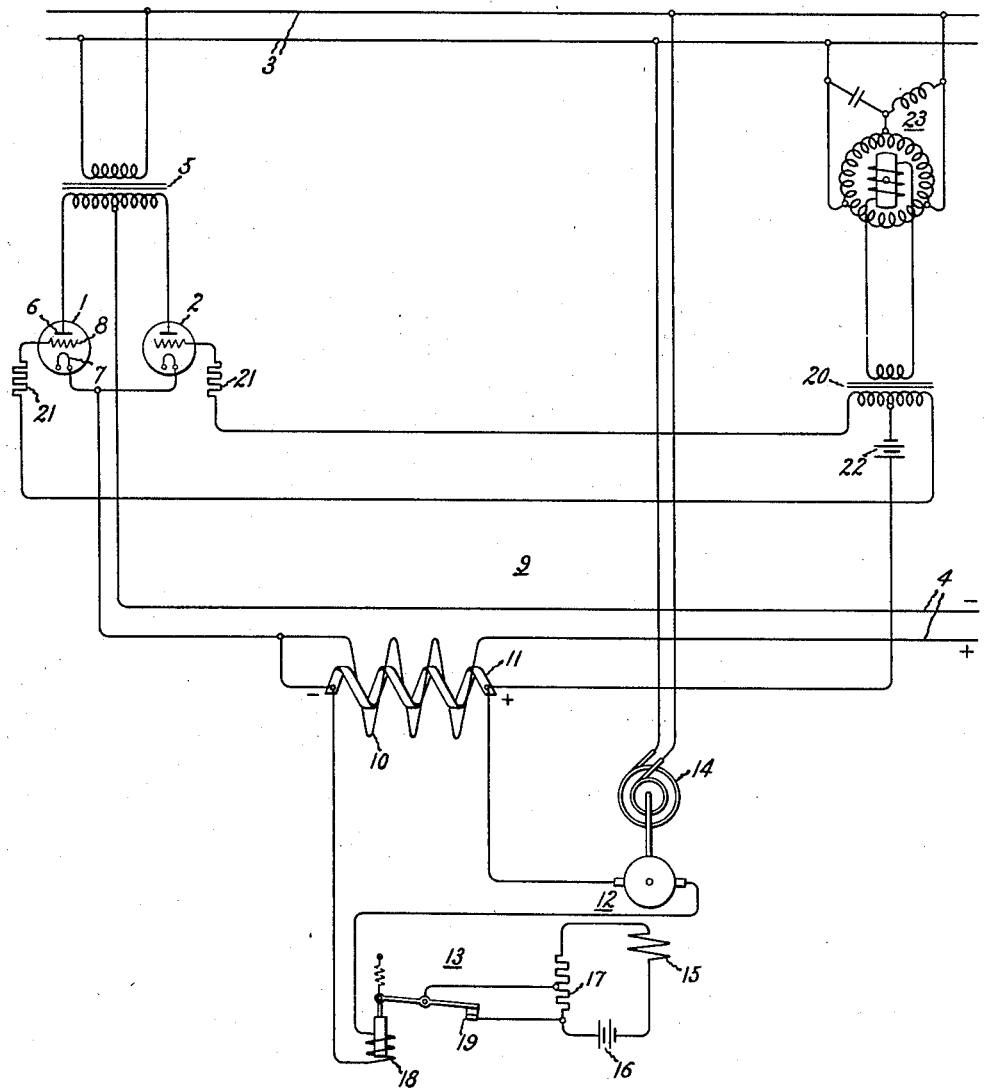
Figure 2:
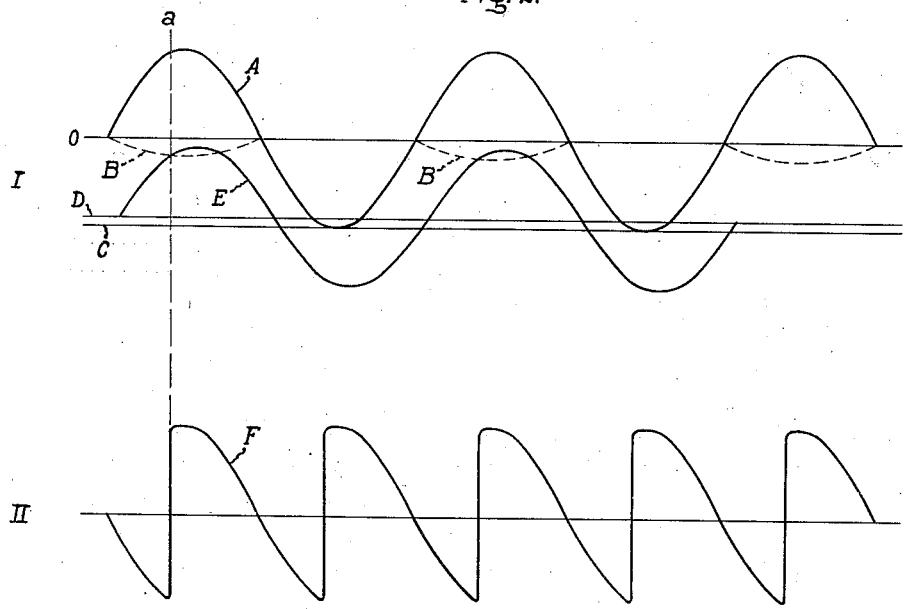
Figure 2A:
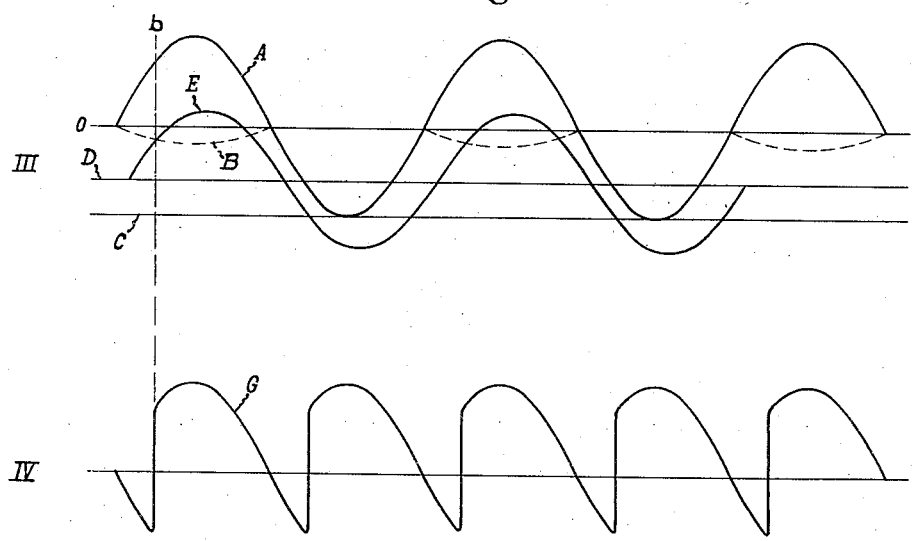
Figure 3:
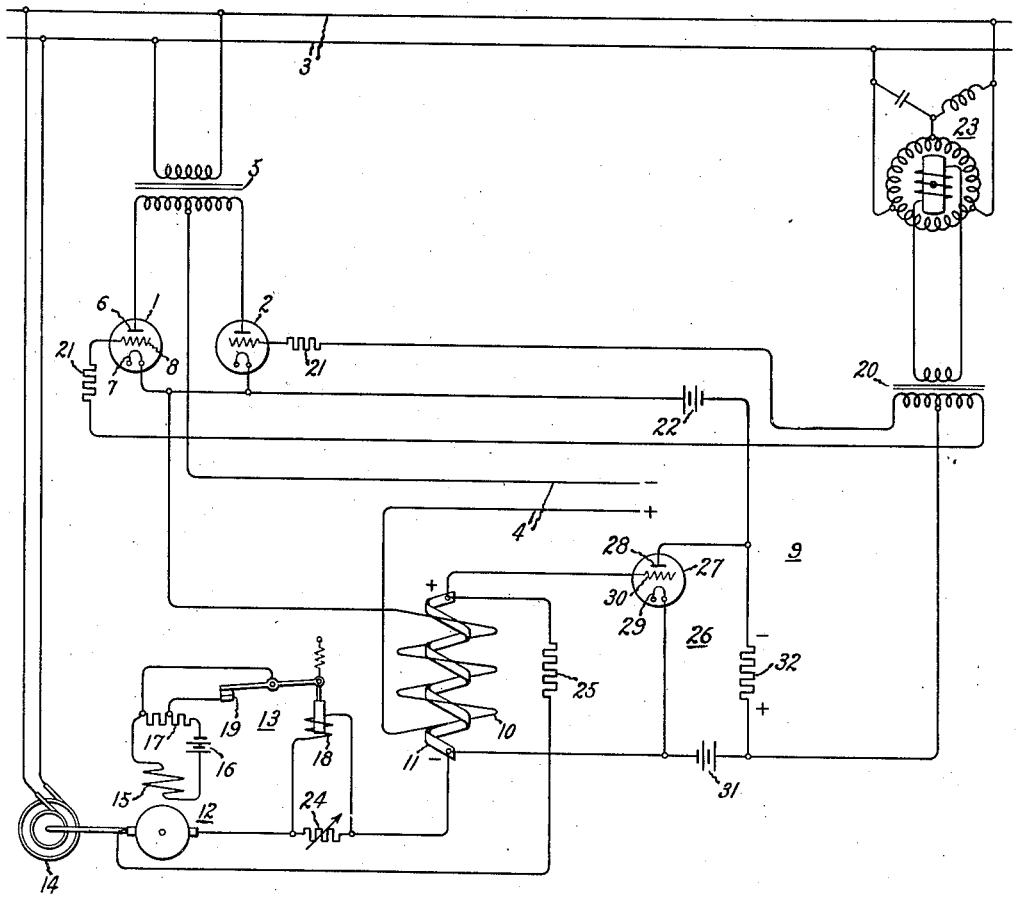

For a better understanding of my invention, reference may be had to the following description taken in connection with the accompanying drawings and its scope will be pointed out in the appended claims. Figs. 1 and 3 of the accompanying drawings diagrammatically illustrate embodiments of my invention as applied to electric valve translating circuits, and Figs. 2 and 2a represent certain operating characteristics thereof.

Referring to the embodiment of my invention diagrammatically shown in Fig. 1, electric valve apparatus, including electronic discharge devices 1 and 2, is employed to transmit energy between an alternating current circuit 3 and a direct current circuit 4 through a transformer 5. Each of the electronic discharge devices includes an anode 6, a cathode 7 and a control member 8 and is preferably of the type employing an ionizable medium such as a gas or a vapor.

In order to control the conductivity of the electronic discharge devices 1 and 2 to effect control of an electrical condition of one of the associated circuits, such as the voltage of the direct current circuit 4, I provide a control or excitation circuit 9 comprising a coil 10 for producing a magnetic field the intensity of which varies in accordance with a predetermined controlling influence such as the current of the direct current circuit 4. To introduce in the excitation circuit a voltage which varies in accordance with the intensity in the magnetic field produced by the coil 10, and hence to introduce in the excitation circuit a voltage which varies in accordance with the electrical condition to be controlled, I provide a resistance element 11 associated with or being in the region of the magnetic field produced by the coil 10. The resistance element 11 may be arranged to form a spiral if desired and is of a material or metal, such as bismuth, the electrical resistance of which varies in accordance with the intensity of the magnetic field.

Any suitable means such as a motor driven direct current generator 12 and a constant current regulator 13 may be employed to supply to the resistance element 11 a direct current of constant value so that the voltage introduced in the excitation circuit 9 by the resistance element 11 varies in accordance with the magnetic field produced by the coil 10. The direct current generator 12 may be driven by any suitable means and in the arrangement shown in Fig. 1 is driven by an alternating current motor 14 energized from the alternating current circuit 3. The direct current generator 12 includes a field winding 15 which may be energized from any suitable source such as a battery 16 through a resistance 17. The energization of the field winding 15 is controlled in accordance with the current delivered by the direct current generator 12 by any suitable means which may be of a conventional type such as a vibratory constant current regulator 13, which comprises a current responsive actuating coil 18 which intermittently opens and closes contacts 19 which serve to shunt a portion of resistance 17 connected in series relation with the field winding 15.

The excitation circuit 9 also includes means such as a transformer 20 for introducing in the excitation circuit alternating voltages adjustable in phase relative to the voltages impressed across anodes 6 and cathodes 7 of electronic discharge devices 1 and 2. Current limiting resistances 21 are connected in series relation with a secondary winding of transformer 20. In order to introduce in the excitation circuit a unidirectional voltage of substantially constant value, I employ any suitable means such as a battery 22 which serves as a standard against which the variable unidirectional voltage, provided by the bismuth resistance spiral, acts. The transformer 20 may be energized from any suitable source of alternating current correlated in phase and frequency relative to the voltages impressed on the anodes 6 of electronic discharge devices 1 and 2. In the particular arrangement shown in Fig. 1, the transformer 20 is shown as being energized from the alternating current circuit 3 through any conventional phase shifting arrangement such as the rotary phase shifter 23.

The operation of the embodiment of my invention diagrammatically shown in Fig. 1 will be explained by considering the electric valve translating system when energy is being transmitted from the alternating current circuit 3 to the direct current circuit 4 through electronic discharge devices 1 and 2 and transformer 5. Since the coil 10 is connected in series relation with the direct current circuit 4, it will be understood that there will be provided by the coil 10 a magnetic field the intensity of which varies in accordance with the current supplied to the direct current circuit 4. Direct current generator 12 and the associated constant current regulator 13 function to supply to the bismuth spiral 11 a direct current of constant value irrespective of the variation in the resistance of the bismuth spiral occasioned by the variation in intensity of the magnetic field produced by the coil 10. The excitation or control circuit 9 will impress on control members 8 of electronic discharge devices 1 and 2 control voltages each of which is the resultant of three components of voltage. One of these components of voltage is the alternating component of voltage provided by the transformer 20; the second component is the unidirectional voltage of substantially constant value provided by the battery 22; and the third component of voltage is the variable unidirectional voltage provided by the bismuth spiral 11.

The operating characteristics represented in Fig. 2 will be of assistance in explaining the operation of the embodiment of my invention shown in Fig. 1. Referring to diagram I of Fig. 2, curve A represents the voltage of the alternating current circuit 3 and may be employed to represent the voltage impressed on one of the electronic discharge devices such as the voltage impressed on electronic discharge device 1. By virtue of the particular connection of transformer 5 of Fig. 1, it will be understood by those skilled in the art that the voltage impressed on electronic discharge device 2 will be 180 electrical degrees out of phase relative to the voltage impressed on electronic discharge device 1. Curves B represent the control characteristics of electronic discharge device 1 and represent the least positive voltage which must be impressed on the control member 8 of the electronic discharge device 1 in order to render the device conductive. It will be understood by those skilled in the art that this characteristic will vary in accordance with the particular type of electronic discharge device employed. Line C represents the unidirectional voltage of substantially constant value introduced in the excitation circuit 9 by battery 22 and the distance of line D above line C represents the variable unidirectional voltage introduced in the excitation circuit by the bismuth spiral 11. Curve E represents the resultant voltage impressed on control member 8 of electronic discharge device 1 and is the resultant of an alternating component of voltage introduced in the excitation circuit by a portion of the secondary winding of transformer 20, the unidirectional component introduced in the excitation circuit by battery 22, and the unidirectional component introduced in the excitation circuit by the bismuth resistance element 11. It is to be understood that when the electronic discharge devices 1 and 2 are of the type employing ionizable mediums, the conductivity of these devices may be controlled by controlling the phase of the resultant voltage impressed on the control members relative to the voltage impressed on the associated anodes. When there is substantial phase coincidence between the voltages impressed on the control members and the voltages impressed on the associated anodes, the conductivity of the electronic devices will be a maximum. Conversely, when there is substantial phase opposition between these voltages the conductivity of the electronic discharge devices will be a minimum, and for intermediate phase relationships the conductivity of the electronic discharge devices will assume corresponding intermediate values. In other words, as concerns the operation of the arrangement shown in Fig. 1, the voltage of the direct current circuit 4 may be controlled by controlling the phase relationship of the voltages impressed on the control members 8 relative to the voltages impressed on the associated anodes 6. Electronic discharge device 1 will be rendered conductive at a time corresponding to the position of line a established by the intersection of curve E with the control characteristic as shown by curve B. The voltage impressed on the direct current circuit 4 may be represented by curve F of diagram II of Fig. 2, the value of the voltage being proportional to the average of the difference in area of the positive and negative portions of this curve. If it is desired to control the electronic discharge devices 1 and 2 so that the voltage impressed on the direct current circuit 4 increases with an increase in load current, the phase of the resultant voltage impressed on the control members 8 may be advanced relative to the voltages impressed on the associated anodes 6. This is accomplished by utilizing the increase in resistance of the bismuth spiral 11 with the increase in intensity of the magnetic field provided by coil 10. Since the current supplied to the bismuth spiral 11 remains substantially constant, as the current of the direct current circuit 4 increases, the voltage appearing across the terminals of the bismuth spiral 11 will also increase to introduce in the excitation circuit 9 a unidirectional voltage of greater magnitude than that introduced in the excitation circuit for lesser values of load current. In diagram III of Fig. 2a this condition is represented and it will be noted that the distance between lines C and D, representing the voltage appearing across the terminals of the bismuth spiral 11, is substantially greater than that represented in diagram I. As a result, the curve E representing the resultant voltage impressed on the control member 8 of electronic discharge device 1 intersects the control characteristic B at a time corresponding to the position of line b. It will be noted that there is an advancement in phase of the resultant control voltage E relative to the voltage represented by curve A. Curve G of diagram IV represents the resultant voltage impressed on direct current circuit 4 by the electronic discharge devices 1 and 2, and since the electronic discharge devices have been rendered conductive at an earlier time during each half cycle of anode voltage, the voltage impressed on the direct current circuit by these devices is substantially greater than the condition represented by curve F of diagram II.

Although in the embodiment of my invention shown in Fig. 1 the bismuth spiral has been shown as being associated with a magnetic field which is responsive to the current of an associated circuit, it is to be understood that my invention in its broader aspects may be applied to electric valve translating circuits generally where it is desired to provide a control voltage which varies in accordance with any predetermined electrical characteristic or condition of associated circuits or apparatus. Furthermore, it is to be understood that the control voltage introduced in the excitation circuit may control the excitation of the associated electronic discharge devices so that the electrical condition to be controlled remains constant or varies in any predetermined manner in accordance with any particular characteristic desirable.

Fig. 3 of the accompanying drawings diagrammatically represents an embodiment of my invention substantially similar to that shown in Fig. 1 and corresponding elements have been assigned like reference numerals. A variable resistance 24 is connected in shunt relation with the actuating coil 18 of the constant current regulator 13 to permit the use of smaller control equipment, and a resistance 25 is connected in series relation with the direct current generator 12 and the bismuth spiral 11 to limit the current through the bismuth spiral to a predetermined value.

As a means for amplifying the voltage appearing across the terminals of the bismuth spiral 11, I provide any suitable device such as a conventional electronic amplifier 26 including an electronic discharge device 27 having an anode 28, a cathode 29 and a control member 30, a source of potential 31 and a resistance 32. The potential impressed across the cathode 29 and the control member 30 is the variable unidirectional voltage appearing across the terminals of the bismuth spiral 11. The voltage appearing across the terminals of resistance 32 is introduced in the excitation circuit 9 and controls the conductivity of electronic discharge devices 1 and 2 in accordance with the current of the direct current circuit 4.

The operation of the embodiment of my invention shown in Fig. 3 is substantially the same as that explained in connection with the embodiment of my invention shown in Fig. 1. The electronic amplifier 26 amplifies the voltage appearing across the terminals of the bismuth spiral 11 to introduce in the excitation circuit 9 a variable unidirectional voltage to control the phase of the resultant voltage impressed on control members 8 relative to the potentials impressed on the associated anodes 6.

My invention may also be applied to overload protective arrangements for electronic discharge devices in which the electronic devices are rendered nonconductive upon the occurrence of an overload condition. If the voltage introduced in the excitation circuits by the bismuth spiral 11 is arranged to be negative, or in other words to assist the voltage provided by the battery 22, upon the occurrence of an overload condition the resultant voltage impressed on the control members 8 of electronic discharge devices 1 and 2 will be retarded in phase sufficiently to prevent the electronic discharge devices from being rendered conductive. This control may be accomplished by the proper design and adjustment of the spiral 11 and the associated electronic amplifier 26.

My invention may also be employed in connection with circuits for controlling the frequency of inverters or frequency changers. The bismuth spiral may be associated with the magnetic field of the main transformer. With a direct current source having a voltage of proper value, the flux of the transformer varies approximately linearly with time during a half cycle. The control circuit may be so arranged that each time the magnetic flux of the transformer has attained a certain value the electronic discharge devices are rendered periodically conductive and nonconductive. If a direct current of constant value is supplied to the bismuth spiral, the voltage drop produced by this current may be used to control the electronic discharge devices. By controlling the current through the spiral, the duration of the periods of conduction and hence the frequency of the inverter may be controlled.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electronic discharge device, means for controlling said device, means for providing a magnetic field the intensity of which varies in accordance with a predetermined controlling influence, and a circuit for controlling the energization of said first mentioned means in accordance with said controlling influence comprising an element in the region of said magnetic field and being of a metal the resistance of which varies in accordance with the intensity of said magnetic field to effect control of said electronic discharge device.

2. In combination, an electronic discharge device having an anode, a cathode and a control member, means for providing a magnetic field the intensity of which varies in accordance with a predetermined controlling influence, and an excitation circuit for said control member of said electronic discharge device comprising an element in the region of said magnetic field and being of a metal the resistance of which varies in accordance with the intensity of said magnetic field for introducing in said excitation circuit a voltage which varies in accordance with said controlling influence.

3. In combination, a supply circuit, a load circuit, electric translating apparatus interposed between said circuits for transmitting energy therebetween and comprising an electronic discharge device having a control member, and an excitation circuit for energizing said control member to control said electronic discharge device in accordance with a predetermined electrical condition of one of said circuits comprising means for providing a magnetic field which varies in accordance with said electrical condition and means including a resistance element of bismuth associated with said first mentioned means for introducing in said excitation circuit a voltage which varies in accordance with said electrical condition.

4. In combination, a supply circuit, a load circuit, an electronic discharge device interposed between said circuits for transmitting energy therebetween and comprising a control member, means for providing a magnetic field the intensity of which varies in accordance with a predetermined electrical quantity of one of said circuits, and an excitation circuit for controlling the conductivity of said electronic discharge device in accordance with said electrical quantity comprising a source of alternating voltage, a bismuth resistance element associated with said first mentioned means for introducing in said excitation circuit a voltage which varies in accordance with said electrical quantity to control the voltage impressed on said control member.

5. In a combination, an electronic discharge device having an anode, a cathode and a control member, a source of alternating current connected to said electric valve, means for providing a magnetic field which varies in accordance with a predetermined controlling influence, and an excitation circuit for energizing said control member comprising a source of alternating voltage and means for controlling the phase of the voltage impressed on said control member relative to the voltage impressed on said anode including a bismuth resistance element associated with said first mentioned means and means for supplying to said bismuth resistance element a direct current of constant value to introduce in said excitation circuit a unidirectional voltage which varies in accordance with said predetermined controlling influence.

6. In combination, an electronic discharge device having an anode, a cathode and a control member, means for providing a magnetic field the intensity of which varies in accordance with a predetermined controlling influence, and an excitation circuit for energizing said control member including a source of alternating voltage and means for controlling the phase of said alternating voltage relative to the voltage impressed on said anode comprising a bismuth resistance element responsive to said magnetic field, means for supplying to said resistance element a direct current of constant value and means for amplifying the voltage appearing across said resistance element to introduce in said excitation circuit a unidirectional voltage which varies in accordance with said controlling influence.

RICHARD TRÖGER.